United States Patent [19]

Bunnelle et al.

[11] Patent Number: 5,459,184

[45] Date of Patent: Oct. 17, 1995

[54] MOISTURE-ACTUATED HOT MELT ADHESIVE

[75] Inventors: William L. Bunnelle, Stillwater; Keith C. Knutson, Columbia Heights; Robert Hume, III, Cottage Grove, all of Minn.

[73] Assignee: H. B. Fuller Company, St. Paul, Minn.

[21] Appl. No.: 719,011

[22] Filed: Apr. 2, 1985

[51] Int. Cl.$^6$ .............................. C08L 79/02; C08K 5/05
[52] U.S. Cl. ............... 524/221; 524/270; 524/275; 524/279; 524/290; 524/292; 524/310; 524/377; 524/385; 524/425; 524/500; 524/540; 524/541; 524/542; 524/612; 428/479.3; 428/479.6; 428/913
[58] Field of Search ................ 524/612, 221, 524/270, 275, 279, 290, 292, 317, 310, 377, 385, 425, 500, 540, 541, 542; 428/479.3, 479.6, 913

[56] References Cited

U.S. PATENT DOCUMENTS

| | | | |
|---|---|---|---|
| 2,978,343 | 4/1961 | Russo et al. | 106/128 |
| 3,373,194 | 3/1968 | Fuhrmann et al. | 260/559 |
| 3,464,933 | 9/1969 | Levy et al. | 260/2 |
| 3,483,141 | 12/1969 | Litt et al. | 260/2 |
| 3,483,145 | 12/1969 | Levy | 260/2 |
| 3,579,630 | 5/1971 | Herz | 424/47 |
| 3,932,358 | 1/1976 | de Cleur et al. | 260/75 N |
| 3,966,836 | 6/1976 | de Cleur et al. | 260/835 |
| 4,001,068 | 1/1977 | Robinson et al. | 156/315 |
| 4,052,368 | 10/1977 | Larson | 260/75 |
| 4,137,385 | 1/1979 | Reitz et al. | 526/50 |
| 4,143,100 | 3/1979 | Schulz et al. | 260/899 |
| 4,144,211 | 3/1979 | Chamberlin et al. | 260/29.2 R |
| 4,163,718 | 8/1979 | Chamberlin et al. | 210/54 |
| 4,172,824 | 10/1979 | Harrington, Jr. et al. | 260/31.2 |
| 4,186,191 | 1/1980 | Chamberlin et al. | 424/78 |
| 4,226,746 | 10/1980 | Schulz et al. | 260/3.3 |
| 4,226,956 | 10/1980 | Schulz et al. | 525/330 |
| 4,325,851 | 4/1982 | Colon et al. | 524/83 |
| 4,331,576 | 5/1982 | Colon et al. | 524/271 |
| 4,408,001 | 10/1983 | Ginter et al. | 524/376 |
| 4,436,789 | 3/1984 | Davis et al. | 428/537 |
| 4,436,867 | 3/1984 | Pomplun | 524/612 |
| 4,464,438 | 8/1984 | Lu | 428/516 |
| 4,481,167 | 11/1984 | Ginter et al. | 422/29 |
| 4,522,967 | 6/1985 | Sheldon et al. | 524/377 |
| 4,532,187 | 7/1985 | Hoenig et al. | 428/457 |
| 4,562,225 | 12/1985 | Huber et al. | 524/602 |
| 4,585,220 | 11/1986 | Hefner, Jr. et al. | 525/411 |
| 4,623,688 | 11/1986 | Flanagan | 524/612 |

FOREIGN PATENT DOCUMENTS

| | | |
|---|---|---|
| 57108-132 | 11/1980 | Japan. |
| 56136-844 | 11/1980 | Japan. |
| 2046761 | 11/1980 | United Kingdom. |

OTHER PUBLICATIONS

Dow Technical Data Bulletin, "Developmental Polymer XAS—10874 Poly(Ethyloxazoline)" Sep. 5, 1984, (3 pages).
PARACIN® 220 bulletin.
ADOL® 620 NF bulletin.
CRODACOLS® bulletin.
CRODACOL® S-95 NF bulletin.
PICCOFLYN® T125 bulletin.
RJ*101* bulletin.
OMYACARB F–T® bulletin.
OMYACARB UF–T® bulletin.
DIACETIN® C–491® bulletin.
DANTOCOL® DHE bulletin.
KEMAMIDE® W–20 bulletin.
KEMAMIDE® W–40 bulletin.
CARBOWAX® bulletin.
IRGANOX® bulletin.
WESTON® 619 bulletin.
CASTORWAX® MP 70 bulletin.
CASTORWAX® MP80 bulletin.
SANTICIZER® 160 bulletin.
NIREZ® V–2040 and NIREZ® V–2150 bulletin.
BENZOFLEX® Product Application bulletin.
BENZOFLEX® 50 bulletin.
BENZOFLEX® S–312 bulletin.
BENZOFLEX® S–404 bulletin.
BENZOFLEX® S–552 bulletin.
PVP/VA® bulletin.
SP–103® bulletin.
"Dow Grooms a Star Adhesive, Chemical Week", Jan. 2–9, 1985, pp. 11, 12.
"New Stickies Detection Method Can Help You Pick the Right Equipment", Paper and Pulp, Mar., 1984, pp. 113–117.

Primary Examiner—C. Warren Ivy
Attorney, Agent, or Firm—Merchant, Gould, Smith, Edell, Welter & Schmidt

[57] ABSTRACT

Hot melt adhesives of this invention can comprise a water-soluble polyalkylenimine, an hydroxy substituted organic compound, and optimally a plasticizer, a tackifier, and other ingredients. The adhesives are water actuated, and can be water activated, cleaned by aqueous systems, or recycled in aqueous systems.

49 Claims, No Drawings

MOISTURE-ACTUATED HOT MELT ADHESIVE

FIELD OF THE INVENTION

The invention relates to a novel class of hot melt adhesives. The adhesives of this invention can be water actuated-can be activated by moisture, can be water soluble, can be recycled with paper products to which they are applied and can be easily cleaned, solubilized or dispersed by the action of water. Further, the adhesives of the invention have additional properties such as the ability to resist the action of non-polar solvents, firm adhesion to hard-to-glue surfaces, thermal stability, etc.

BACKGROUND OF THE INVENTION

Hot melt adhesives are applied to a substrate at elevated temperature in a melt form in the substantial absence of a solvent. Upon contact with a substrate the hot melt adhesive can cool, solidify, and form a strong bond. Hot melt adhesives can be both pressure sensitive and non-pressure sensitive depending on formulation. In the past, hot melt adhesives have been made predominantly from hydrophobic or water-resistant components and in that form have satisfied many adhesive requirements. However, the hydrophobic or water-resistant nature of the adhesives have many drawbacks. First, the adhesives tend to be insoluble in water and can be difficult to recycle in aqueous systems. Further, such hydrophobic adhesives tend to be soluble in non-polar solvents. Further, adhesives that are activated by moisture or easily cleaned using aqueous systems are difficult to make from hydrophobic components.

The needs of a number of adhesive applications have not been fully met by typical hot melt adhesives. For example, typical hot melt adhesives have insufficient adhesion to fluorocarbon materials, and polyester materials. Water-soluble, water-sensitive, water-activated adhesives have potential applications and a variety of end uses including label stock, envelope gum, "POST-IT"™ notes, stamp gum, bindery tapes, sealing tapes, repulpable adhesives, general pressure-sensitive hot melts, non-pressure-sensitive hot melts, carton sealing adhesives, paper-to-paper adhesives and contact lens blocking or mounting adhesives.

The most common water-sensitive or water soluble hot melt adhesives are based on polymers containing vinyl pyrrolidone or other vinyl heterocyclic monomers as taught by Colon et al. in U.S. Pat. Nos. 4,331,576 and 4,325,851. These adhesives are made from vinyl pyrrolidone polymers, vinyl pyrrolidone/vinyl acetate copolymers, and other vinyl pyrrolidone based polymers. Another class of water-sensitive hot melt adhesives include the polyester-based adhesives typically comprising a copolyester in combination with a plasticizer, which are disclosed in Morrison, U.S. Pat. No. 4,052,368 and in Harrington, Jr., et al., U.S. Pat. No. 4,172,824.

The polyvinyl pyrrolidone adhesive can be applied as solvent-free liquids to an appropriate substrates from a reservoir or "glue pot" heated to temperatures of up to about 150°–200° C. Water-sensitive adhesives based on a polyvinyl pyrrolidone or a polyvinyl pyrrolidone/vinyl acetate base often exhibit poor thermal stability. Such adhesive formulations can rapidly degrade (in less than 24 hours) at the elevated pot temperatures which are employed during their application. Further, such adhesives can exhibit inadequate adhesive strength and slow bond set.

Therefore, a substantial need exists for a hot melt adhesive composition that can be substantially heat stable, water-sensitive, can form strong permanent bonds, can be formulated to be moisture-activated or pressure-sensitive, and can be readily solubilized or dispersed in water so that it can be cleaned or repulped in common recycling processes.

BRIEF DESCRIPTION OF THE INVENTION

We have found that an exceptional hot melt adhesive composition having high temperature stability can be prepared by blending various adhesive components with a hydroxy substituted organic compound and a polyalkylenimine polymer. The polymers are N-acyl substituted polyalkylenimine polymers, which for simplicity, we will refer to the polymers as a polyalkylenimine. The polyalkylenimine polymers are disclosed by Levy et al., U.S. Pat. No. 3,464,933; Litt et al., U.S. Pat. No. 3,483,141; Levy et al., U.S. Pat. No. 3,483,145; and Fuhrmann et al., U.S. Pat. No. 3,373,194 the disclosures of which are hereby incorporated by reference herein. These patents teach polymers having recurring units of the general structure:

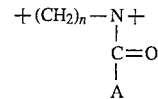

wherein A is $-R_3-(OR_2)_p-OR$,

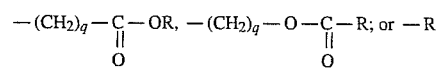

wherein n is about 2–6, p is about 0–3, q is about 1–15; R is a $C_1$–$C_{15}$ substantially hydrocarbon radical such as alkyl, alkyl substituted aryl, etc. including such groups as methyl, ethyl, isobutyl, pentyl, cyclohexyl, 2-ethyl-hexyl, dodecyl, naphthyl, tolyl, benzyl, chloromethyl, fluoroethyl, chlorophenyl and phenylethyl; and $R_2$ and $R_3$ are selected from the group consisting of divalent hydrocarbon and substituted hydrocarbon radicals such as alkylene and arylene. Specific examples of $R_2$ and $R_3$ groups include methylene, ethylene, tetramethylene; ortho, meta and paraphenylene; tolylene ($C_6H_4CH_2$), chloroethylene, fluoroethylene, and chlorophenylene.

The Levy, et al., Litt, et al and Fuhrmann, et al. patents teach that polymers, having side chains resulting in water solubility, can be used as adhesives. However, these patents do not teach that the polyalkylenimines can be combined with hydroxy organic components or other components that yield hot melt adhesives. Further, the patents fail to show that the polyalkylenimine polymers can be combined with other compositions to form pressure sensitive or moisture activated adhesives which are: stable at high temperatures.

The hot melt adhesives of the invention comprise a water-soluble polyalkylenimine base, an effective amount of a hydroxy substituted organic compound and optionally an effective amount of components such as a plasticizer composition, a tackifier composition, a filler, an antioxidant, etc. The adhesive compositions of this invention can also contain other components which can modify the adhesive properties or add additional adhesive properties to the basic adhesive compositions.

A first aspect of the invention comprises an effective amount, from 10–75 wt-% of the polyalkylenimine polymer, an effective amount, about 10–50 wt-% of the hydroxy substituted organic compound and the balance of the formulation made from such additional components such as organic extenders, non-blocking additives, anti-oxidants, inorganic fillers, dyes, colorants, etc.

A second aspect of the invention is an adhesive comprising an effective amount, from 10–75 wt-% of the polyalkylenimine polymer, an effective amount, about 10–50 wt-% of the hydroxy substituted organic compound, an effective tackifying amount, from 1–50 wt-% of a tackifying agent, and the balance of the composition made up of other components such as organic extenders, antioxidants, inorganic fillers, colorance, perfumes, etc.

A third aspect of the invention is an adhesive comprising an effective amount, from 10–75 wt-% of the polyalkylenimine polymer, an effective amount, 1–50 wt-% of a plasticizer compound, an effective amount, about 1–50 wt-% of a hydroxy substituted organic compound and the balance of the composition made up of other components as recited above.

A fourth aspect of the invention is an adhesive comprising an effective amount, about 10–60 % of the polyalkylenimine polymer, an effective amount, about 1–50 wt-% of the hydroxy substituted organic compound, an effective amount, about 1–50 wt-% of a plasticizer compound, an effective amount, about 1–25 wt-% of a tackifying compound, and the balance of the composition made up of other optional compositions as listed above.

Still another aspect of the invention comprises the methods for forming the water sensitive hot melt adhesives of this invention and the methods of their use.

DETAILED DESCRIPTION OF THE INVENTION

Characterized broadly, the adhesives of the invention contain a polyalkylenimine, in combination with a hydroxy substituted organic compound and other adhesive components. The polyalkylenimines which can be used in the adhesives of this invention are commonly prepared by the polymerization of heterocyclic monomers of the general formula I:

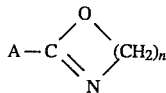

wherein A and n are as defined above. The polymers and polymerization techniques are in general as disclosed in U.S. Pat. Nos. 3,483,141 and 3,293,245, the disclosures of which are incorporated by reference herein.

Preferred polyalkylenimines include polyethylenimines and polypropylenimines which are prepared by polymerizing heterocyclic monomers of the formula I wherein n is 2 or 3. These polyalkylenimines can be represented by the general formula II:

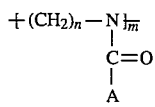

wherein A is as defined hereinabove, n is about 2–3 and m is about 50–10,000, preferably about 100–7500. Most preferably the heterocyclic monomer will comprise an alkyl substituted-2-oxazoline, i.e. n=2. The molecular weights of the polymers derived from such monomers can range from less than 50,000 to 500,000 or above. The polymers are available in low (less than about 100,000), moderate (about 100,000 to 300,000) and high (greater than about 300,000) molecular weights. A molecular weight is selected generally to obtain a desired final viscosity. These polymers are soluble in water and many polar organic solvents, but can be advantageously insoluble in non-polar organic solvents. The polymers are thermally stable, low in solution viscosity, possess acceptable melt flow properties, and have low toxicity. The polyoxazoline polymers of this invention are available from the Dow Chemical Co.

The most preferred polyoxazoline polymers of this invention, for reasons of their low cost and high performance in adhesive applications, are polymers having the following formula:

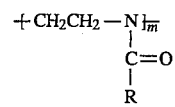

wherein m is as defined above and R is a $C_1$–$C_{12}$ alkyl such as methyl, ethyl, isopropyl, t-butyl, cyclohexyl, cyclopentyl, methyl-cyclohexyl, dodecyl and the like. Preferably R will be an alkyl group having about 1–5 carbon atoms.

Other base polymer compositions can be added to the polyalkyleneimine to add to and to vary the polyalkyleneimine polymer properties. The additional base polymeric compositions are preferably compatible with the polyalkylenimine polymer and other hot melt adhesive components, heat stable and somewhat moisture sensitive. Examples of useful additional polymer bases include polyamide materials, polyester materials, acrylic polymers such as polyacrylamides, polyacrylates, polymethacrylates, poly (alkene-acrylic acid) copolymers, etc.

Hydroxy Substituted Organic Compound

The hot melt adhesives of this invention can contain a hydroxy substituted organic compound. The hydroxy substituted organic compound can be used to provide a number of functions to the composition. First, the combination of the organic properties and the hydroxy group in the compound promotes the formation of uniform homogenous single phase compositions. Further, the hydroxy substituted organic compounds tend to produce adhesives with a workable viscosity, a controlled rate of set and heat resistance. Lastly, the blending of sufficient quantities of the hydroxy substituted organic compounds in the hot melt adhesives of this invention can substantially reduce (if desired) the pressure-sensitive properties of the adhesive. The important aspects of the hydroxy substituted organic compound is that it contains one or more hydroxy groups attached to an essentially organic composition. The organic composition can be essentially aliphatic or aromatic. Many hydroxy substituted organic compounds exist including alcohols, hydroxy substituted waxes, polyalkylene oxide polymers ( such as Carbowax®) and many others.

Preferred hydroxy substituted organic compounds include: $C_{10}$–$C_{30}$ fatty alcohols, hydroxy substituted waxes, hydroxy substituted fats, hydroxy substituted fatty acids, hydroxy substituted fatty amides, diacetin, polyalkylene oxide polymers having a molecular weight of less than about 2000, preferably about 1000, such as polyethylene oxide, polypropylene oxide and others. For compatibility purposes we have found that the hydroxyl number of the hydroxy substituted organic compound should be at least 160 or preferably between a 200 and 500, and that at a level of more than 20 wt % of a 160 hydroxyl member, hydroxywax, an effective amount, 5 to 10 wt %, of a $C_{8-20}$ fatty acid, preferably a $C_{8-20}$ saturated fatty acid can be used.

Tackifying Agent

The polyoxazoline polymer itself has insufficient pressure-sensitive properties. The addition of a compatible tackifying resin is commonly necessary to form a sufficiently adherent pressure-sensitive polymer blend.

Many tackifying agents such as resins or resin blends are well known in the art. Such resins include rosin acids, hydrogenated rosins, tall oil pitch heads (residue) ACIN-TOL® tall oil-Arizona chemical, polyketones, polymerized mixed olefins, alkyl resins, phenolic resins and terpene-phenolic resins. Especially-preferred tackifying resins for use in the present compositions include the rosin acids (Sylvatac®-RX Silvachem Comp.) phenolic resin SP103 (Schenectady Chemical Corp.) and terpene-phenolic resins such as the Nirez® series, e.g. Nirez® V-2040, V-2150 (Reichhold Chemicals, Inc., Pensacola, Fla.) and phenolic-modified hydrocarbon terpene resins (Piccofyn T-125, Hercules, Inc.

Plasticizer

Plasticizers are generally classified as materials which can be incorporated into another material to increase its workability, flexibility or distensibility. The addition of the plasticizer can lower melt viscosity, the temperature of the second order transition point or the elastic modulus of the treated material.

Plasticizers that can be used in the adhesive compositions of this invention can generally be selected from those which are compatible with the polyalkylenimine base polymers. For adhesive applications in which water-sensitivity or solubility is important, both liquid and solid water-soluble plasticizers can be used.

Commonly-employed plasticizers include compounds of the following classes: adipic acid derivatives, azeleic acid Water-soluble plasticizers are preferred for use in pressure-sensitive adhesive compositions which are formulated so as to be water-releasable. Useful plasticizers of this type include the liquid polyalkylene glycols, e.g. polyethylene glycols (PEG) of molecular weights of about 200–800.

Filler

The present adhesive formulations can also comprise an effective amount of an inorganic extender or filler, such as calcium carbonate, zinc oxide, alumina, clays, titanium dioxide, talc, carbon black and the like. For example, the adhesives formulated to be moisture-sensitive and or repulpable can comprise up to about 25 wt-% of a mineral extender which is preferably fatty acid estercoated to increase its organophilicity. One commerically-available filler of this type is the stearate-calcium carbonate compound Omyacarb® UF-T (Omya, Inc., Proctor, Vt.). The filler material can also function to reduce (if desired) the pressure-sensitivity of the moisture-activated adhesives of the present invention.

The hot melt adhesive compositions may also incorporate relatively small amounts of adjuvants such as UV absorbers, heat stabilizers, flavorings, release agents, additional anti-blocking agents and antioxidants. Typical antioxidants include the Irganox® series (Ciba-Giegy) such as Irganox 1076, octadecyl-3,5-di-tert-butyl-4-hydroxy hydrocinnamate and the distearyl pentaerythritol diphosphite (Weston® 619, Borg-Warner Chemicals). When present, such adjuvants will commonly make up less than 5% by weight of the present adhesives.

Compositions of representative preferred adhesive formulations of the present invention are summarized in Table I, below.

TABLE I

Typical Adhesive Formulations

| Ingredient | Water Releasable HM-PSA | Moisture-Activated Adhesive | Book Binding Adhesive | Repulpable Hot Melt Adhesive | Contact Lens Mounting Adhesive |
|---|---|---|---|---|---|
| Polyalkylenimine | 20–45 | 30–55 | 15–60 | 30–55 | 15–50 |
| Tackifying Agent | 15–40 | 2–15 | — | 2–50 | — |
| Plasticizer[+] | | 0–20[+] | 10–30 | 15–40 | — |
| Wax (hydroxy) | — | 10–35 | 10–40 | 5–40 | 5–60 |
| Filler | — | 0–35 | — | 0–35 | 5–35 |
| Plasticizer (Hydroxy Compound) | 25–40 | | | | |

[+]Preferably having an agreeable taste or no taste.

derivatives, benzoic acid derivatives, diphenyl derivatives, citric acid derivatives, epoxides, glycolates, isophthalic acid derivatives, maleic acid derivatives, phosphorous acid derivatives, phthalic acid derivatives, polyesters, trimelitates and the like. Preferred water-insoluble plasticizers can be selected from any of the commercially-available benzoates, hydroxylated benzoates or the acetates or benzoates of polyols, such as the acetates or benzoates of $C_2$–$C_6$ polyols comprising about 2–6 hydroxyl groups. Such plasticizers include acetin, glyceryl diacetate (Hullco C-491), glycerol tribenzoate (Benzoflex® S-404), or pentaerythritol tetrabenzoate (Benzoflex® S-552) or the mixed dibenzoates of dipropylene glycol and diethylene glycol (Benzoflex® 50, Velsicol Corp., Chicago, Ill. ) Another useful water-insoluble plasticizer is butyl benzyl phthalate, available from Monsanto Co. as Santicizer® 160.

Preparation

The hot melt adhesives of the present invention are prepared by combining the components in a hot melt condition by employing heating and mixing equipment typically employed in the formulation of compositions of the hot melt type. One preferred method involves combining the antioxidant if any, with all or a portion of the organic components, other than polyalkyleneamine polymer and hydroxy compound, and heating the mixture to a temperature at which it is a flowable liquid (200° to 350° F.). The stirred mixture is then treated with the polyalkylenimine slowly until fully blended. The hydroxy organic compound is then added and the inorganic fillers, colorants, etc. are added. The hot blend is mixed until homogeneous, then filtered and cooled.

The adhesives of this invention are applied to the substrates, e.g. cellulosics, fluorocarbon sheets, spun bonded polyester, polyester bottles, etc., in thin films as hot melts.

The adhesives of the invention can be used to make adherent articles by applying to at least one surface of a sheet-like material a thin film of the adhesive. Sheet like material can be made of cellulosic materials, polymeric materials, fiberglass materials, composite graphite-polyamide fiber materials, etc. The adherent articles can be labels, tapes, structural members, etc.

Application of the adhesive to the sheet like substrate may be by roller, dip plus doctor blade, printed dots, extrusion application wheels or other similar, well-known apparatus.

Example I—Water Releasable

Pressure-Sensitive Hot Melt Adhesive

| Ingredient | Weight Percent | |
|---|---|---|
| | A | B |
| Base polymer (Poly(alkylenimine))+) | 35 | 37.5 |
| Plasticizer (glyceryl diacetate, Hallco C-491) | 35 | 37.5 |
| Tackifier (SP-103 Resin) | 29.5 | 24.5 |
| Anti-oxidant (octadecyl-3,5-di-tert-butyl-4-hydroxy hydrocinnamate, Irganox ® 1076) | 0.5 | 0.5 |

+)PEOx (Dow Chemical USA, molec. wt. 500,000, n = 5,000).

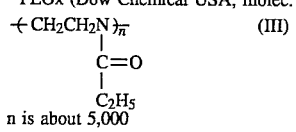

n is about 5,000

The plasticizer and the tackifier are added to a stirred stainless steel beaker and were heated and blended at 350° F. until a smooth, blended melt was formed. The PEOx was added with the Irganox and the mix was blended until smooth.

Litho paper labels coated to between 1 and 2 mil thickness with the compositions of Exs. IA and IB adhered firmly to vinyl, glass and stainless steel surfaces. The labels could not be removed under conditions of pressure without destroying the labels, but were readily released when contacted with a stream of water.

Example II—Moisture-Activated

Hot Melt Adhesive

| Ingredient | Weight Percent |
|---|---|
| Base Polymer (Poly(ethylenimine)+) | 39.5 |
| Hydroxywax (partially hydrogenated castor oil, principle constituent, glyceryl tri(12-hydroxy stearin)* (Castorwax MP-80) | 10.0 |
| Fatty alcohol (stearyl alcohol, Crodacol S-95NF) | 20.0 |
| Filler (Omyacarb UF-T CaCO₃* | 25.0 |
| Tackifier (phenolic-modified hydrocarbon terpene resin, Piccofyn T-125*) | 5.0 |
| Antioxidant (Irganox ® 1076) | |

-continued

| Ingredient | Weight Percent |
|---|---|

+)PEOx (Dow Chemical U.S.A. low m.w., see Formula III p. 13 n = 500

*Typical properties of Piccofyn T-125 are as follows:

| | |
|---|---|
| Softening point, R & B °C. | 120 |
| Color, Gardner | 7 |
| Acid number | <1 |
| Saponification number | <2 |
| Bromine number | 77 |
| Weight at 25° C., lbs/gal (kg/L) | 8.7 (1.04) |
| Viscosity at 25° C., stokes 7% solids solution in toluene | 70 |
| Melt viscosity, cps, 150° C. | 7,500 |
| 160° C. | 2,500 |
| 170° C. | 800 |
| 180° C. | 320 |

The physical and chemical properties of partially hydrogenated 12-hydroxy stearin are as follows:

| Physical and Chemical Properties | |
|---|---|
| Color, Gardener | 2 |
| Acid value | 2 |
| Saponification value | 180 |
| Iodine value | 29 |
| Hydroxyl value | 158 |
| Melting point, °C. | 80 |
| Volume resistivity at 100° C. | $8.0 \times 10^{10}$ |
| Dielectric constant at 1 kC at 25° C. | 15.6 |
| Dielectric constant at 1 kC at 100° C. | 3.79 |
| Dissipation factor at 1 kC at 25° C. | 0.006 |

The ingredients are melted together in the following order. (1) Crodacol S-95NF, antioxidant, and Piccofyn T-125 (2) $_{PE}$Ox (3) Castorwax MP-80 (4) Omyacarb. The initial viscosity of the finished hot melt at 350° F. is 1175 cp and after aging at 350° F. for 24 hrs, is still within the acceptable limit of 1100 cp. The pot life and pot color are also satisfactory after 24 hr at 350° F.

When applied to envelope stock and allowed to set, a 1 mil film of the adhesive of Example II remained non-blocking up to about 65–73% relative humidity (72 hr, 1 psi, 73° F.).

Example III—Repulpable

Hot Melt Bookbinding Adhesive

| Ingredient | Weight Percent |
|---|---|
| Base Polymer (Poly(ethyleneimine)+) | 44.8 |
| Plasticizer (methyl micinoleate, Flexricin P-1) | 25.0 |
| Hydroxy wax (N-(2-hydroxy ethyl)-12-hydroxy stearamide, Paracin 220) | 30.0 |
| Antioxidant (Irganox ® 1076) | 0.2 |

+)PEOx (Dow Chemical U.S.A. 500,000 m.w. see Formula III, page 13 n = 5,000)

The above ingredients were melted together in a stirred stainless steel beaker in the following order (1) Plasticizer and Anti-oxidant (2) PeOx and (3) hydroxywax.

Example IV—Contact Lens

Blocking or Mounting Composition

| Ingredient | Weight Percent |
| --- | --- |
| Base Polymer (polyethyleneimine+) | 35.0 |
| Hydroxywax (Castorwax) | 19.8 |
| Filler (Omyacarb UF-T-CaCO$_3$) | 25.0 |
| Hydroxywax (glyceryl-mono-hydroxy stearate, Paracin 13) | 20.0 |
| Antioxidant (Irganox ® 1076) | 0.2 |

+)PEOx (Dow Chemical U.S.A. 50,000 m.w., see Formula III, page 13 n = 500)

The physical and chemical properties of partially hydrogenated 12-hydroxy stearin are as follows:

| Physical and Chemical Properties | |
| --- | --- |
| Color, Gardener | 2 |
| Acid value | 2 |
| Saponification value | 180 |
| Iodine value | 29 |
| Hydroxyl value | 158 |
| Melting point, °C. | 80 |
| Volume resistivity at 100° C. | $8.0 \times 10^{10}$ |
| Dielectric constant at 1 kC at 25° C. | 15.6 |
| Dielectric constant at 1 kC at 100° C. | 3.79 |
| Dissipation factor at 1 kC at 25° C. | 0.006 |

The above ingredients were melted together in a stirred stainless steel beaker in the following order (1) hydroxywaxes (2) antioxidant (3) PEOx (4) filler.

The contact lens adhesive is a substitute for a hydrophobic composition currently used in the contact lens industry. The current blocking adhesives require a chlorinated hydrocarbon solvent to dissolve the adhesive and requires an ultrasonic cleaning step for complete removal. The chlorinated solvent is believed to pose some health hazard to workers and can harm polymeric lens surfaces. The contact lens adhesive of this invention is fully water soluble, is non-toxic and results in substantial time and cost savings.

Example V—Rollwrap Adhesive

| Ingredient | Weight Percent |
| --- | --- |
| Base polymer (polyethyleneimine+) | 44.0 |
| Hydroxywax (Paracin 220) | 20.0 |
| Hydroxywax (polyethylene glycol, molecular weight of about 285 to 315, Carbowax 300) | 30.0 |
| Tackifier (Piccofyn T-125) | 5.8 |
| Antioxidant (Irganox ® 1076) | 0.2 |

PEOx Dow Chemical U.S.A. m.w. = 200,000, see Formula III, page 13 n = 2,000)

The above ingredients were melted together, in the following order (1) tackifier and antioxidant (2) hydroxywaxes (3) base polymer, in a stainless steel stirred beaker at 350° F. until smooth.

The resulting adhesive was used to attach the rollwrap to rolls of paper in a paper mill. Upon application the adhesive had a 2 minute open time and bonded strongly at temperatures in the range of 140° F. to −60° F. The adhesive was stable at 350° F. The adhesive formed no skin or char for 45 days and maintained a useful viscosity at 350° F.

Example VI

Case Sealing Adhesive

| Ingredient | Weight Percent |
| --- | --- |
| Base Polymer (polyalkylenimine+) | 39.8 |
| Hydroxy wax (Paracin 220) | 30.0 |
| Plasticizer (Flexricin P-1) | 30.0 |
| Tackifier (Piccofyn T-125) | 10.0. |
| Antioxidant (Irganox ® 1076) | 0.2 |

PEOx Dow Chemical U.S.A. m.w. = 50,000, see Formula III, page 13, n = 500

The above ingredients were melted in a stainless steel beaker at 350° F. in the following order (1) tackifier and antioxidant (2) plasticizer (3) base polymer and (4) hydroxywax.

The above specification and Examples provide a basic disclosure of the invention. However, since many embodiments and variations of the invention can be made without departing from the spirit and scope of the invention, the invention is embodied in the claims hereinafter appended.

We claim:

1. A water-activated, thermally-stable solvent-free homogeneous hot-melt adhesive composition comprising:

(a) about 10–75% by weight of an N-substituted polyalkylenimine of the formula:

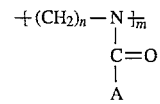

wherein n is about 2–3, m is about 100–10,000, and A is —R$_3$—(OR$_2$)$_p$OR, —(CH$_2$)$_q$CO$_2$R, —(CH$_2$)$_q$O$_2$CR or R, q is about 1–15, p is about 0–3, R is C$_1$–C$_{15}$ alkyl and R$_2$ and R$_3$ are alkylene;

(b) about 10 to 50 wt-% of a hydroxy substituted organic compound having a hydroxyl number of at least about 160 and a molecular weight of less than about 2,000; and (c) 0 to 30% of a compatible plasticizer, a compatible tackifier or mixtures thereof.

2. The composition of claim 1 wherein the hydroxy substituted organic compound comprises a hydroxy substituted wax, a polyalkylene oxide or mixtures thereof.

3. The composition of claim 1 wherein the N-substituted polyalkylenimine comprises an N-substituted polyethylenimine of the formula:

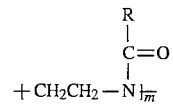

wherein R is C$_1$–C$_{12}$ alkyl and m is about 250–7500.

4. The composition of claim 3 wherein, the N-substituted polyethyleneimine has a molecular weight of 50,000 to 500,000.

5. The composition of claim 2 wherein the N-substituted polyalkylenimine comprises an N-substituted polyethylenimine of the formula:

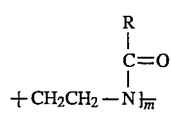

wherein R is $C_1$–$C_{12}$ alkyl and m is about 250–7500, and wherein the tackifier comprises a phenolic resin or a terpenephenolic resin.

6. The composition of claim 2 wherein the N-substituted polyalkyleneimine comprises an N-substituted polyethylenimine of the formula:

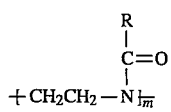

wherein R is $C_1$–$C_{12}$ alkyl and m is about 250–7500, and wherein the tackifier comprises a polyketone resin.

7. The composition of claim 1 wherein the N-substituted polyalkylenimine comprises an N-substituted polyethylenimine of the formula:

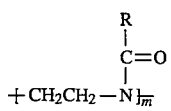

wherein R is $C_1$–$C_{12}$ alkyl and m is about 250–7500, and wherein the plasticizer comprises an acetate or a benzoate of a $C_2$–$C_6$ polyol having 2 to 6 hydroxyl groups.

8. A water-actuated, thermally-stable, pressure sensitive, homogeneous hot melt solvent-free adhesive composition comprising:

(a) about 20–45% by weight of an N-substituted polyethylenimine of the formula:

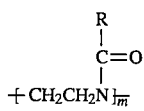

wherein m is about 100–10,000 and R is a $C_1$–$C_5$ alkyl group;

(b) about 25–40% by weight of a compatible hydroxy substituted organic compound having a hydroxyl number of at least about 160 and a molecular weight of less than about 2,000; and (c) about 15–40% by weight of a compatible tackifier; wherein said adhesive composition can form bonds that are releasable when said adhesive composition is contacted with water.

9. The composition of claim 7 wherein the N-substituted polyalkylenimine has a molecular weight of about 50,000 to 500,000.

10. The composition of claim 8 wherein the tackifier comprises a rosin acid, a phenolic resin or a terpenephenolic resin.

11. The composition of claim 9 wherein the tackifier comprises a polyketone resin.

12. The composition of claim 8 wherein the N-substituted polyakylenimine has a molecular-weight of about 50,000 to 500,000, and wherein the plasticizer comprises an acetate or benzoate of a $C_2$–$C_6$ polyol having 2 to 6 hydroxy groups.

13. An adherent article comprising a sheet of material having on at least one side of said sheet, a film of the composition of claim 7.

14. A thermally-stable, moisture-actuated homogeneous hot melt solvent-free adhesive composition comprising:

(a) about 30–55% by weight of a water-soluble N-substituted polyethylenimine of the formula:

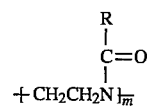

wherein m is about 100–10,000 and R is a $C_1$–$C_5$ alkyl group;

(b) about 2–15% by weight of a compatible tackifier;

(c) about 1 to 50 wt-% of a hydroxy substituted organic compound to render said adhesive composition substantially non-pressure sensitive prior to the addition of moisture, the hydroxy substituted organic compound having a hydroxyl number of at least about 160 and a molecular weight less than about 2,000; and (d) about 0–35% by weight of an inorganic filler; wherein a film of said adhesive composition is water-activatable but remains resistant to blocking during storage under ambient conditions.

15. The composition of claim 14 wherein the composition comprises about 10–40% by weight of the compatible hydroxy substituted organic compound, and wherein the compatible hydroxy substituted organic compound comprises a hydroxy wax.

16. The composition of claim 14 wherein the inorganic filler comprises calcium carbonate.

17. An adherent article comprising a sheet of material having on at least one side a film of the composition of claim 14.

18. The adherent article of claim 17 wherein the material of the sheet is cellulosic.

19. A thermally-stable, water soluble homogeneous hot-melt solvent-free adhesive composition comprising:

(a) about 30–55% by weight of a water-soluble N-substituted polyethylenimine of the formula:

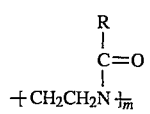

wherein m is about 100–10,000 and R is a $C_1$–$C_5$ alkyl group;

(b) about 15–45% by weight of a compatible plasticizer;

(c) about 2–50% by weight of a compatible tackifier;

(d) about 5–35% by weight of a hydroxy substituted organic compound comprising a hydroxy wax having a molecular weight less than about 2,000; and (e) about 0–30% by weight filler;
wherein said adhesive is readily dispersed or dissolved when contacted with aqueous repulping systems.

20. The composition of claim 19 wherein the hydroxy wax comprises a hydroxy amide wax.

21. The composition of claim 19 wherein the filler comprises calcium carbonate.

22. The composition of claim 20 wherein the plasticizer comprises polyethylene oxide polymer having a molecular weight of less than 2,000.

23. The composition of claim 20 wherein the plasticizer comprises a ricinoleic acid ester or amide.

24. A book comprising a cover, and a section comprising the pages of the book joined at a spine wherein the cover is joined to the spine with the adhesive of claim 20.

25. A water-activated, thermally-stable solvent-free homogeneous single-phase hot-melt adhesive composition comprising:
(a) about 10–75% by weight of an N-substituted polyalkylenimine of the formula:

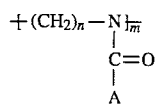

wherein n is about 2–3, m is about 100–10,000, and A is $-R_3-(OR_2)_pOR$, $-(CH_2)_qCO_2R$, $-(CH_2)_qO_2CR$ or R, q is about 1–15, p is about 0–3, R is $C_1$–$C_{15}$ alkyl and $R_2$ and $R_3$ are alkylene;
(b) about 10 to 50 wt-% of a hydroxy substituted organic compound having a hydroxyl number of at least about 160 and a molecular weight of less than about 2,000; and
(c) 0 to 30% of a compatible plasticizer, a compatible tackifier or mixtures thereof.

26. The composition of claim 25 wherein the aryl group comprises an alkyl aryl group.

27. The composition of claim 25 wherein the hydroxy substituted organic compound comprises a hydroxy substituted wax, a polyalkylene oxide or mixtures thereof.

28. The composition of claim 25 wherein the N-substituted polyalkylenimine comprises an N-substituted polyethylenimine of the formula:

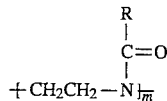

wherein is $C_1$–$C_{12}$ alkyl and m is about 250–7500.

29. The composition of claim 28 wherein the N-substituted polyethylenimine has a molecular weight of 50,000 to 500,000.

30. The composition of claim 27 wherein the N-substituted polyalkylenimine comprises an N-substituted polyethylenimine of the formula:

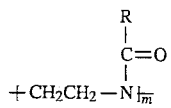

wherein R is $C_1$–$C_{12}$ alkyl and m is about 250–7500, and wherein the tackifier comprises a phenolic resin or a terpene-phenolic resin.

31. The composition of claim 26 wherein the N-substituted polyalkylenimine comprises an N-substituted polyethylenimine of the formula:

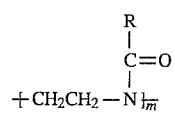

wherein R is $C_1$–$C_{12}$ alkyl and m is about 250–7500, and wherein the tackifier comprises a polyketone resin.

32. The composition of claim 25 wherein the N-substituted polyalkylenimine comprises an N-substituted polyethylenimine of the formula:

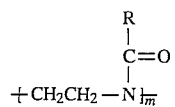

wherein R is $C_1$–$C_{12}$ alkyl and m is about 250–7500, and wherein the plasticizer comprises an acetate or a benzoate of a $C_2$–$C_6$ polyol having 2 to 6 hydroxyl groups.

33. A water-actuated, thermally-stable, pressure sensitive, homogeneous single-phase hot melt solvent-free adhesive composition comprising:
(a) about 20–45% by weight of an N-substituted polyethylenimine of the formula:

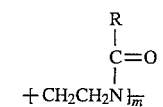

wherein m is about 100–10,000 and R is a $C_1$–$C_5$ alkyl group;
(b) about 25–40% by weight of a compatible hydroxy substituted organic compound having a hydroxyl number of at least about 160 and a molecular weight of less than about 2,000; and
(c) about 15–40% by weight of a compatible tackifier;
wherein said adhesive composition can form bonds that are releasable when said adhesive composition is contacted with water.

34. The composition of claim 33 wherein the N-substituted polyalkylenimine has a molecular weight of about 50,000 to 500,000.

35. The composition of claim 33 wherein the tackifier comprises a rosin acid, a phenolic resin or a terpene-phenolic resin.

36. The composition of claim 34 wherein the tackifier comprises a polyketone resin.

37. The composition of claim 33 wherein the N-substituted polyalkylenimine has a molecular weight of about 50,000 to 500,000, and wherein the plasticizer comprises an acetate or benzoate of a $C_2$–$C_6$ polyol having 2 to 6 hydroxy groups.

38. An adherent article comprising a sheet of material having on at least one side of said sheet, a film of the composition of claim 33.

39. A thermally-stable, moisture-actuated homogeneous single-phase hot melt solvent-free adhesive composition comprising:
(a) about 30–55% by weight of a water-soluble N-substituted polyethylenimine of the formula:

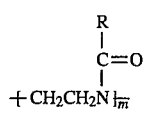

wherein m is about 100–10,000 and R is a $C_1$–$C_5$ alkyl group;

(b) about 2–15% by weight of a compatible tackifier;

(c) about 1 to 50 wt-% of a hydroxy substituted organic compound to render said adhesive composition substantially non-pressure sensitive prior to the addition of moisture, the hydroxy substituted organic compound having a hydroxyl number of at least about 160 and a molecular weight less than about 2,000; and (d) about 0–35% by weight of an inorganic filler; wherein a film of said adhesive composition is water-activatable but remains resistant to blocking during storage under ambient conditions.

40. The composition of claim 39 wherein the composition comprises about 10–40% by weight of the compatible hydroxy substituted organic compound, and wherein the compatible hydroxy substituted organic compound comprises a hydroxy wax.

41. The composition of claim 39 wherein the inorganic filler comprises calcium carbonate.

42. An adherent article comprising a sheet of material having on at least one side a film of the composition of claim 39.

43. An adherent article of claim 42 wherein the material of the sheet is cellulosic.

44. A thermally-stable, water soluble homogeneous single-phase hot-melt solvent-free adhesive composition comprising:

(a) about 30–55% by weight of a water-soluble N-substituted polyethylenimine of the formula:

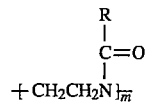

wherein m is about 100–10,000 and R is a $C_1$–$C_5$ alkyl group;

(b) about 15–45% by weight of a compatible plasticizer;

(c) about 2–50% by weight of a compatible tackifier;

(d) about 5–35% by weight of a hydroxy substituted organic compound comprising a hydroxy wax having a molecular weight less than about 2,000; and (e) about 0–30% by weight filler;

wherein said adhesive is readily dispersed or dissolved when contacted with aqueous repulping systems.

45. The composition of claim 44 wherein the hydroxy wax comprises a hydroxy amide wax.

46. The composition of claim 44 wherein the filler comprises calcium carbonate.

47. The composition of claim 46 wherein the plasticizer comprises a polyethylene oxide polymer having a molecular weight of less than 2,000.

48. The composition of claim 46 wherein the plasticizer comprises a ricinoleic acid ester or amide.

49. A book comprising a cover, and a section comprising the pages of the book joined at a spine wherein the cover is joined to the spine with the adhesive of claim 46.

* * * * *